United States Patent [19]

Takeuchi

[11] 4,325,016

[45] Apr. 13, 1982

[54] DEVICE FOR CONTROLLING PICKUP ARM MOVEMENT IN LINEAR TRACKING PICKUP ARM APPARATUS

[75] Inventor: Atsushi Takeuchi, Hamamatsu, Japan

[73] Assignee: Nippon Gakki Seizo Kabushiki Kaisha, Hamamatsu, Japan

[21] Appl. No.: 159,383

[22] Filed: Jun. 13, 1980

[30] Foreign Application Priority Data

Jun. 15, 1979 [JP] Japan .................... 54-75397
Jun. 15, 1979 [JP] Japan .................... 54-75398
Jun. 21, 1979 [JP] Japan .................... 54-78369

[51] Int. Cl.³ .............................. G05B 1/06
[52] U.S. Cl. ......................... 318/640; 360/77
[58] Field of Search .......... 318/640, 480; 360/77; 274/9 RA

[56] References Cited

U.S. PATENT DOCUMENTS

| 3,906,326 | 9/1975 | Chur | 318/640 |
| 3,945,037 | 3/1976 | Johnson | 360/77 |
| 3,994,016 | 11/1976 | Moghadam | 360/77 |
| 4,202,549 | 5/1980 | Takeuchi | 318/640 X |

Primary Examiner—B. Dobeck
Attorney, Agent, or Firm—Cushman, Darby & Cushman

[57] ABSTRACT

A device for controlling movements of pickup arm in linear tracking pickup arm apparatus comprises an offset angle detecting mechanism of photo-electricity conversion type for detecting a horizontal offset of the arm and a servo mechanism for correcting the arm offset. The servo mechanism is disabled by turning-off a light-emitting element in the detecting mechanism when the pickup arm is at an uplifting position as well as at limiting end positions in a horizontal arm travel. The initiation of the servo action of the mechanism is effected gradually by gradual illumination of the light-emitting element.

26 Claims, 8 Drawing Figures

DEVICE FOR CONTROLLING PICKUP ARM MOVEMENT IN LINEAR TRACKING PICKUP ARM APPARATUS

BACKGROUND OF THE INVENTION (a) Field of the Invention:

The present invention concerns a device for controlling the movement of a pickup arm in a linear tracking pickup arm apparatus such as record or video disc player.

(b) Description of the Prior Art:

Known linear tracking pickup arm apparatuses are arranged so that, when a record disc or a video disc carried on a platter is played, a pickup arm is caused to progressively more linearly and radially of the disc, while being held tangential relative to the signal-carrying groove of the disc to allow a stylus or pickup tip of the pickup cartridge mounted at the foremost end of the pickup arm to progressively trace the signal groove toward the center of the disc. A general arrangement of such devices for controlling the movement of the pickup arm in known linear tracking pickup arm apparatuses comprises a servo system including a mechanism for detecting a horizontal offset angle of the moving pickup arm caused by the groove-tracing stylus and a mechanism for causing the pickup arm supporting carriage to travel in parallel with the direction of movement of the stylus to compensate for any offset angle detected by the detecting mechanism, to thereby always keep the pickup arm tangential to the signal groove of the disc.

Such linear tracking pickup arm apparatus requires the provision of means for disabling the servo system of the pickup arm movement controlling device whenever it is intended to move the pickup arm in a required direction in its upwardly pivoted position, when the user wants to make a quick return of the pickup arm to its initial position in the midst of playing or upon completion of playing of the disc, or when the user wants to bring the stylus to the lead-in position, or when the user wants to manually move the pickup arm by his fingers.

Figure 1:
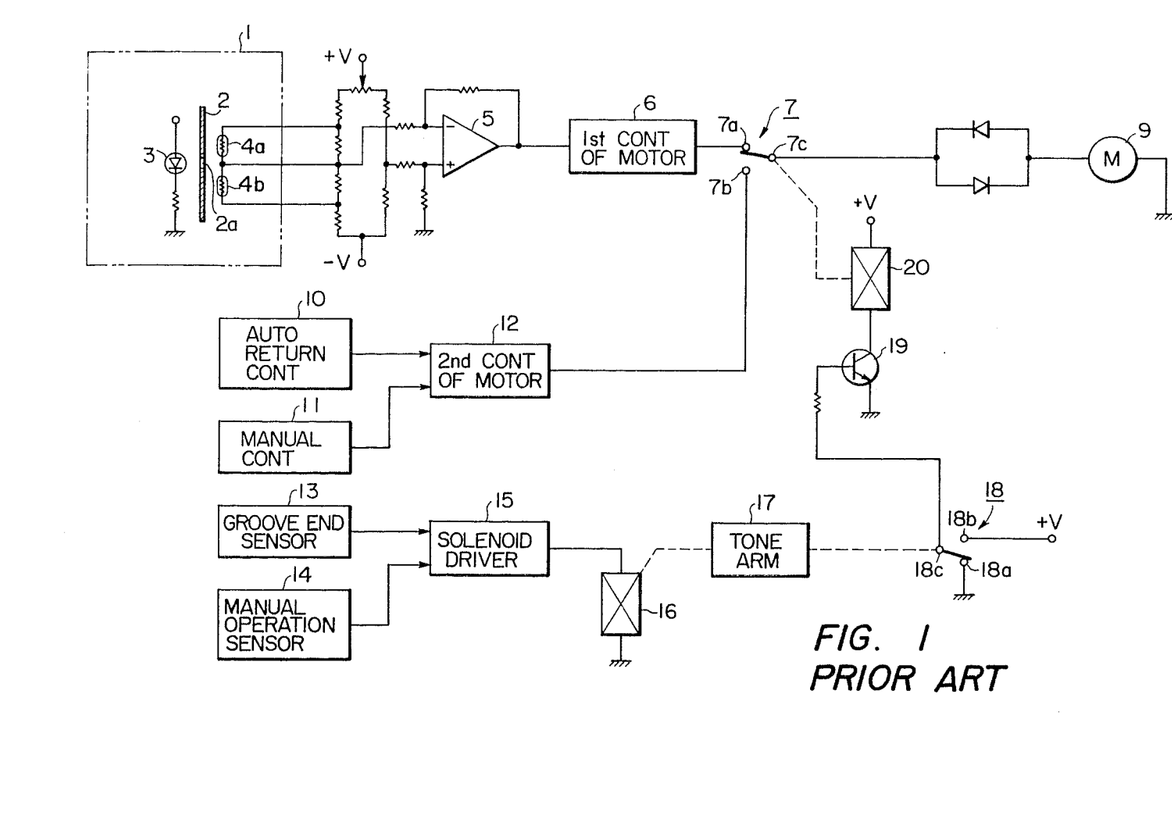
FIG. 1 is a block diagram showing an example of circuit arrangement of a known device for controlling the movement of a pickup arm in a linear tracking pickup arm apparatus.

FIG. 1 shows an example of arrangement of a known device for controlling the movement of a pickup arm, designed to effect the disablement of the servo system. Reference numeral 1 represents a mechanism for detecting a horizontal offset angle of a pickup arm, designed to make this detection through a so-called photo-electricity converting system comprising a slit-carrying shutter plate 2 having a slit 2a and adapted to rotate horizontal in accordance with any horizontal swing of the travelling pickup arm, a light-emitting element 3 such as light-emitting diode disposed on one side of the slit-carrying shutter plate 2 and a pair of light-receiving elements 4a and 4b such as CdS photo-cells which are disposed on the other side of the shutter plate 2 to normally receive the light beam of the light-emitting element 3. Any horizontal displacement of the pickup arm is adapted to generate a change in voltage across resistors connected to the light-receiving elements to form a bridge circuit with the light-emitting element. The resulting output voltage of this offset angle detecting mechanism 1 is compared with a reference voltage in an operational amplifier 5, and its output is supplied to a first drive control circuit 6 for a motor 9 assigned to drive the pickup arm.

The first drive control circuit 6 for the motor generates a motor drive signal in accordance with an output of the operational amplifier 5, and delivers this signal to a contact point 7a of a changeover switch means 7. Suppose now that the record disc is being played, i.e. that the pickup arm head is in its lowermost position. A movable contact piece 7c of this switch means 7 is then in contact with the contact point 7a. Accordingly, the motor drive signal of the first drive control circuit 6 is supplied to the motor 9, causing this motor to rotate to move the pickup arm supporting carriage along a travel passageway, so that the pickup arm is driven while being corrected of its offset angle. On the other hand, in case a pickup arm quick return signal is generated by an autoreturn control circuit 10, or in case a manual operation command signal for the pickup arm is generated by a manual operation control circuit 11, such signal is supplied to a second drive control circuit 12 for the motor 9. On the basis of this signal, the second drive control circuit 12 delivers a motor drive signal to a contact point 7b of the switch means 7.

This changeover switch means 7 is arranged so that, with an upward tilting of the pickup arm, the connection of the movable contact 7c is switched from a contact point 7a to a contact point 7b. That is, when the completion of reproduction of the recorded signal of the disc is detected by a groove end sensor 13, or when a manual operation command signal for the pickup arm is detected by a manual operation detector 14, either one of these signals, as the case may be, is supplied to a solenoid drive circuit 15. Whereupon, this circuit 15 energizes a solenoid 16 to actuate its plunger to upwardly swing the pickup arm. When the pickup arm 17 is thus upwardly swung, a movable contact 18c of a changeover switch means 18 is switched of its connection from a contact point 18a to a contact point 18b, causing a transistor 19 connected to this switch 18 to be rendered conductive. Whereupon, a relay 20 connected to this transistor 19 is energized, so that the connection of the movable contact 7c of the switch means 7 is switched from the contact point 7a over to the contact point 7b. As a result, the motor drive signal of the second drive control 12 is supplied to the motor 9 to drive it in accordance with either the abovesaid quick return signal or the manual operation signal.

As stated above, the known pickup arm drive control device is arranged to be operative so that its relay 20 is energized in accordance with an ascension and a descension of the pickup arm 17 so as to change the connection of the changeover switch means 7 to transmit selectively an output signal of either the first drive control circuit 6 for sevo action or the second drive control circuit 12 for non-servo action to the motor 9 assigned to cause a travel of the pickup arm supporting carriage.

In such known device, however, a relay 20 is required as a means for effecting the switching of the connection of the changeover switch means 7. The employment of this relay has led to a complexity of the device and a cost-up of the apparatus as a whole.

In addition, such known linear tracking pickup arm apparatus as stated above has another problem when the pickup arm is to be moved manually utilizing the servo system. More particularly, in case the pickup arm of the apparatus is to be moved directly with the fingers of the user, the servo system has to be rendered to the enabled state, and the pickup arm is urged to move in a required direction to develop an output of the offset angle detecting mechanism, to thereby actuate the pickup arm moving mechanism. In such manual mode operation of the pickup arm using one's fingers, the pickup arm supporting carriage is allowed to move continuously by the servo system so long as the pickup arm is being urged by the user's fingers. Thus, there is the inconvenience that the pickup arm is moved beyond its limits of movement, causing an over-run of the pickup arm.

Furthermore, this known pickup arm apparatus having the above-mentioned arrangement has the following further inconvenience at the time of initiating the movement of the pickup arm. When this mechanism is about to drive the pickup arm, the servo system of the offset angle detecting mechanism is activated to be ready to detect any offset angle. Accordingly, in case at such moment the pickup arm is displaced to a substantial extent by an external force, a large angel is detected, and the pickup arm will be moved abruptly with a sudden great torque to result in an over-run of this arm.

SUMMARY OF THE INVENTION

It is, therefore, a general object of the present invention to provide a device for controlling the movement of a pickup arm in a linear tracking pickup arm apparatus, which greatly improves the inconveniences encountered in the prior art such devices.

A primary object of the present invention is to provide a pickup arm movement controlling device described above, which has an offset angle detecting mechanism employing photo-electricity converting system arranged so that the disablement of its actuated servo function is carried out with the cease of emission of the light beam of a light-emitting element provided in this system.

Another object of the present invention is to provide a device of the type described above, in which the turn-off of the light beam of the light-emitting element is effected by an upward tilting of the pickup arm.

Still another object of the present invention is to provide a device of the type described above, in which the turn-off of the light beam of the light-emitting element is effected also when the pickup arm has reached each one of its limit positions to thereby avoid an over-run of the arm.

A further object of the present invention is to provide a device of the type described above, in which the initiation of the servo system of the offset angle detecting mechanism iscarried out greatly.

A still further object of the present invention is to provide a device of the type described above, in which the lighting-up of the light-emitting element is effected gently.

DETAILED DESCRIPTION OF THE PREFERRED EMBODIMENT

Description will be made first of the general concept and general circuit arrangement of the device for controlling the movement of the pickup arm embodying the present invention for use in a linear tracking pickup arm apparatus.

Figure 2:
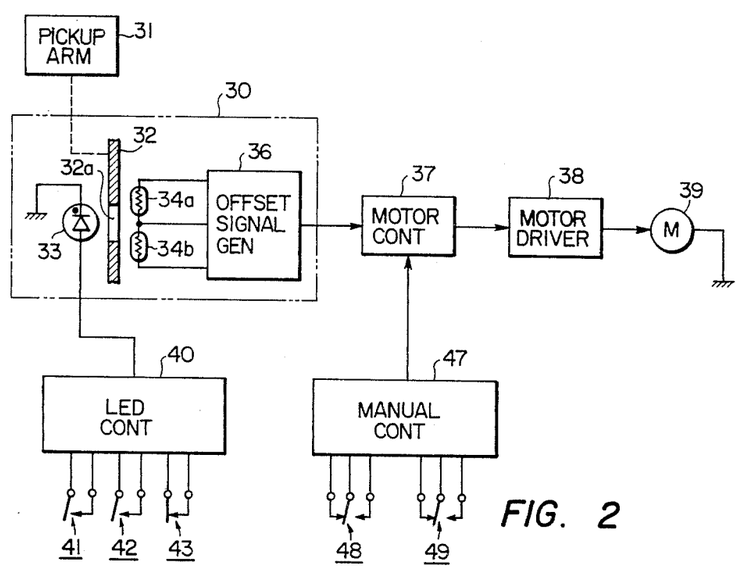
FIG. 2 is a block diagram showing an embodiment of a general circuit arrangement of the device for controlling the movement of a pickup arm according to the present invention.

FIG. 2 is a block diagram showing the general arrangement of the pickup arm movement controlling device. It should be understood here that the pickup arm is adapted to be lifted upwardly by the action of a solenoid drive circuit energized by a signal delivered from a signal groove end sensor or from a manual operation detector, in a manner similar to that for the known pickup movement controlling device shown in FIG. 1.

The offset angle detecting mechanism 30 for the pickup arm 31 is comprised of a photo-electricity converting means so as to detect an offset angle of the pickup arm whenever the pickup arm is displaced from its position tangential to a signal-carrying groove. This offset angle detecting mechanism 30 comprises: a slit-carrying shutter plate 32 having a slit 32a and being adapted to rotate by following any horizontal swing of the pickup arm 31; a photo-electricity converting means formed with a light-emitting element such as a light-emitting diode 33 which will hereinafter be abbreviated as LED and which is disposed on one side of the shutter plate 32, and a pair of side-by-side light-receiving elements such as CdS photo-conductive cells which will hereinafter be referred to as CdS's 34a and 34b; and an offset angle signal generating circuit 36 adapted to output the varying internal resistance values of these CdS's which are derived as a varying voltage. It should be understood that the slit-carrying shutter plate 32 is adapted to rotate only for an angle equal to an offset angle $\Delta\theta$ which is assumed by the pickup arm 31. Thus, the position of the beam of light impinging onto the photo-electricity converting elements after passing through the slit 32a of the plate 32 corresponds to this offset angle $\Delta\theta$ assumed by the pickup arm 31. The output of this offset angle detecting mechanism 30 is supplied to a motor-controlling circuit 37 which delivers, to a motor driving circuit 38, a motor-controlling signal corresponding to the output of said detecting mechanism 30 to drive a dc motor 39. Thus, the pickup arm 31 is driven through this motor 39 while being corrected of its displacement corresponding to the offset angle detected.

In the present invention, the enabling and disenabling of the servo action of the offset angle detecting mechanism 30 for the pickup arm 31 is controlled by an operation of an LED-controlling circuit 40. This LED-controlling circuit 40 is arranged to turn on or turn out an LED 33 by the make and break of switch means 41 to 43 of this circuit 40. The switch means 41 is adapted to break and make in accordance with the upward and downward swings of the pickup arm 31, i.e. the LED 33 is turned out when the pickup arm 31 swings upwardly, and is turned on when the arm head of this pickup arm is lowered in its position. Here, it should be understood that this lowered position of the pickup arm appearing in this specification signifies a position relative to the upwardly tilted position of the pickup arm, and that the lowered position includes a position where the stylus of the cartridge provided at the arm heard portion is still not in contact with the signal groove but is just above it. The upwardly swung or tilted position of the pickup arm will hereinafter be referred to as an uplifted position. On the other hand, the switches 42 and 43 are adapted to be changed over of their connections as the pickup arm 31 in its lowered position is to be moved manually, in such way that when the pickup arm has arrived at each of the two end limit positions of movement shown at A (left or proximal limit position closer to the spindle of the platter) and at B (right or distal limit position) in FIG. 3, the LED 33 is turned out, and that when the pickup arm 31 has moved inside of these limit positions, the LED 33 is lighted up.

Figure 3:
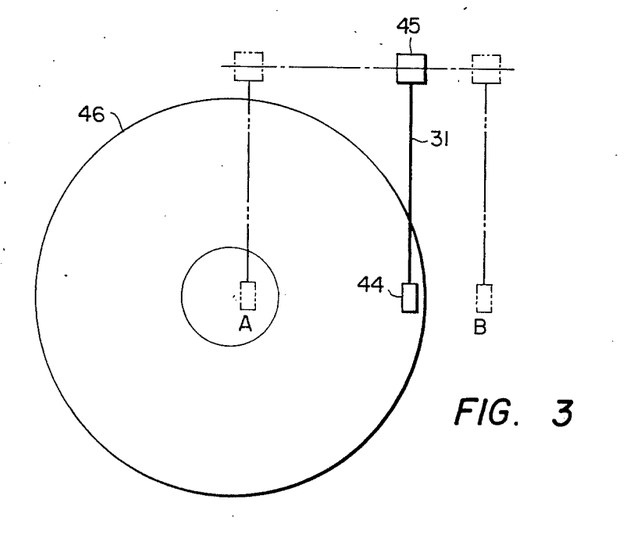
FIG. 3 is a somewhat diagrammatic illustration showing the positional relationship of the pickup arm relative to a record or video disc mounted on a platter of the apparatus shown in FIG. 2.

According to the present invention, the LED-controlling circuit 40 is arranged to light up the LED 33 not abruptly but gently or gradually so that the amount of light emitting from the LED will gradually increase, to thereby gradually enable the offset angle detecting mechanism 30. In FIG. 3, reference numeral 44 represents a pickup head or cartridge, 45 a pickup arm base support, i.e. carriage, and 46 a record or video disc mounted on a platter not shown.

The abovesaid motor-controlling circuit 37 has a switch means 48 for delivering a signal to the motor-controlling circuit 37 to move the uplifted pickup arm to the left side in FIG. 3, and another switch means 49 for generating a signal to said circuit 37 to move the pickup arm to the right side in the drawings. Furthermore, this motor-controlling circuit 37 is adapted to be supplied also with a signal from a return controlling circuit not shown for the sake of simplicity. Upon receipt of this signal, the circuit 37 operates so that the pickup arm 31 is fed toward th right side in FIG. 3.

Figure 4:
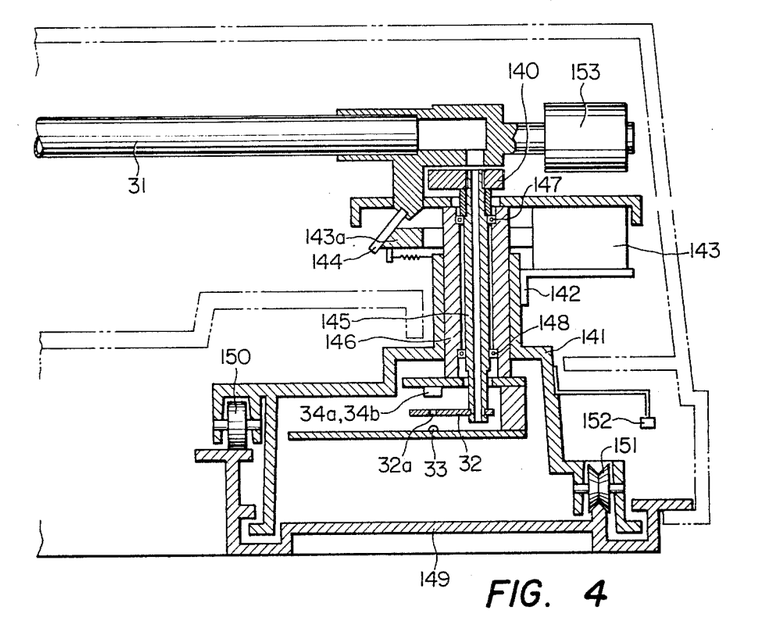
FIG. 4 is a diagrammatic sectional view showing the general arrangement of the base portion of the pickup arm of the present invention.
Figure 5:
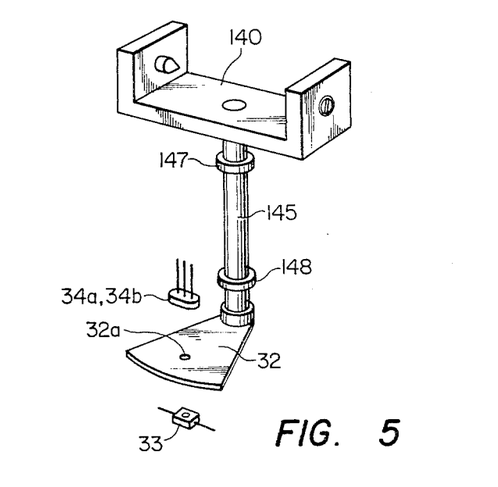
FIG. 5 is a diagrammatic perspective views, on an enlarged scale, of the offset angle detecting mechanism for the pickup arm according to the present invention.

FIGS. 4 and 5 show the mechanism for causing uplifting and lowering of the pickup arm 31 as well as causing horizontal travel and rotation of same. The base portion of the pickup arm 31 is supported on a U-shaped horizontal bearing 140 for vertical movements. The uplifting of the pickup arm 31 is effected by the action of a plunger 143a of a solenoid 143 which is supported on an arm member 142 attached to a supporting member or carriage 141. When this solenoid 143 is actuated, its plunger 143a advances to push a pin 144 secured to a bottom portion of the pickup arm 31, so that this pickup arm 31 is pivoted upwardly, i.e. uplifted. The pin 144 is adapted also to actuate the switch 41 when the pickup arm 35 is uplifted. The horizontal bearing 140 is mounted on a vertical shaft 145 which, in turn, is supported by bearings 147 and 148 for rotation relative to an inner tube 146 of the carriage 141. This rotation of the vertical shaft 145 causes the rotation of the slit-carrying shutter plate 32 to vary the amount of the light beam of the LED 33 arriving at the CdS's 34a and 34b. The carriage 141 having its horizontal bearing 140 and vertical shaft 145 mounted thereon via the inner tube 146 is allowed to travel in a direction perpendicular to the longitudinal axis of the pickup arm 31 on rollers 150 and 151 provided on a linear guide rail 149 which is fixed to the body of the record or video disc player.

This travel is effected by the motor 39 shown in FIG. 3. Reference numeral 152 represents an actuator for actuating the switches 42 and 43 located in a horizontal path of the carriage to be actuated when the pickup arm is in the aforesaid limit positions A and B shown in FIG. 3, and 153 a counter weight for the pickup arm 31.

Description will next be directed to the operation of the pickup arm movement controlling device of the present invention whose arrangement has been outlined above.

Firstly, a reproduction of a signal carried on the groove is performed by driving the pickup arm 31 in the following manner. Let us here suppose that the pickup arm 31 is in its uplifted position. In this state, the LED 33 is turned out by the break of the switch means 41 of the LED-controlling circuit 40. When the pickup arm is lowered in its position to start the playing of, for example, a record disc, the switch means 41 is changed over of its connection by this downward movement of the pickup arm, while causing the LED 33 to be lighted up gradually by the LED-controlling circuit 40, thus gradually enabling the offset angle detecting mechanism 30. Since this mechanism 30 thus increases the intensity of its output gradually, it will be understood that, even when the pickup arm 31 is displaced largely before starting the tracing of the signal groove, the correction of this displacement is not effected abruptly. When, thereafter, the tracing of the signal-carrying groove of the disc is started, the offset angle detecting mechanism 30 starts the detection of any offset angle of the pickup arm. Upon receipt of a signal of a detected offset angle from the detecting mechanism 30, the motor-controlling circuit 37, and accordingly the motor-driving circuit 38 are actuated to drive the motor 39 to move the carriage 141 so as to compensate for the offset angle detected.

In case the pickup arm 31 is uplifted by a command signal during the above-mentioned condition, the switch means 41 is changed over of its connection, so that the LED 33 is turned out by the LED-controlling circuit 40, and the offset angle detecting mechanism 30 is disabled of its servo action. For example, in case it is intended to make a manual operation of the uplifted pickup arm without directly touching the pickup arm by the user's fingers, it is only necessary to operate either one of the above-stated switch means 48 and 49 of the manual operation controlling circuit 47, as the case may be. Whereupon, a signal generated by this circuit 47 is supplied to the motor controlling circuit 37 which, in turn, generates a motor controlling signal to the motor drive circuit 38 to drive the motor 39 based on this signal. As a result, the pickup arm 31 is moved in accordance with the manual operation mode.

Also, in case it is intended to move the pickup arm 31 by the user's fingers, the pickup arm is held at a position slightly lowered from its uplifted position as will not cause the stylus of the cartridge 44 of this pickup arm to be brought into contact with the surface of the record disc 46. Such limited lowering of the pickup arm 31 also enables the servo action of the offset angle detecting mechanism 30. Therefore, by urging this pickup arm by his fingers in a required direction, the pickup arm is caused to make an offset angle so that the offset angle detecting mechanism 30 is actuated to deliver an output, causing the motor 39 to be driven to allow the pickup arm 31 to move easily in said required direction. Accordingly, so long as the pickup arm 31 is imparted an offset angle relative to the normal line of the direction of travel of the carriage 141, the pickup arm 31 is caused to move in the direction of the required displacement to such extent as would pass beyond the limits of its movement. However, when the pickup arm 31 has arrived at either one of the limit positions A and B, the switch means 42 or 43 of the LED controlling circuit 40 is changed over of its connection, causing the light beam emitting from the LED 33 to be turned out. As a result, the output of the offset angle detecting mechanism 30 drops to nil, and along therewith the rotation of the motor 39 is ceased, so that the urged travel of the pickup arm 31 is brought to a halt.

Figure 6:
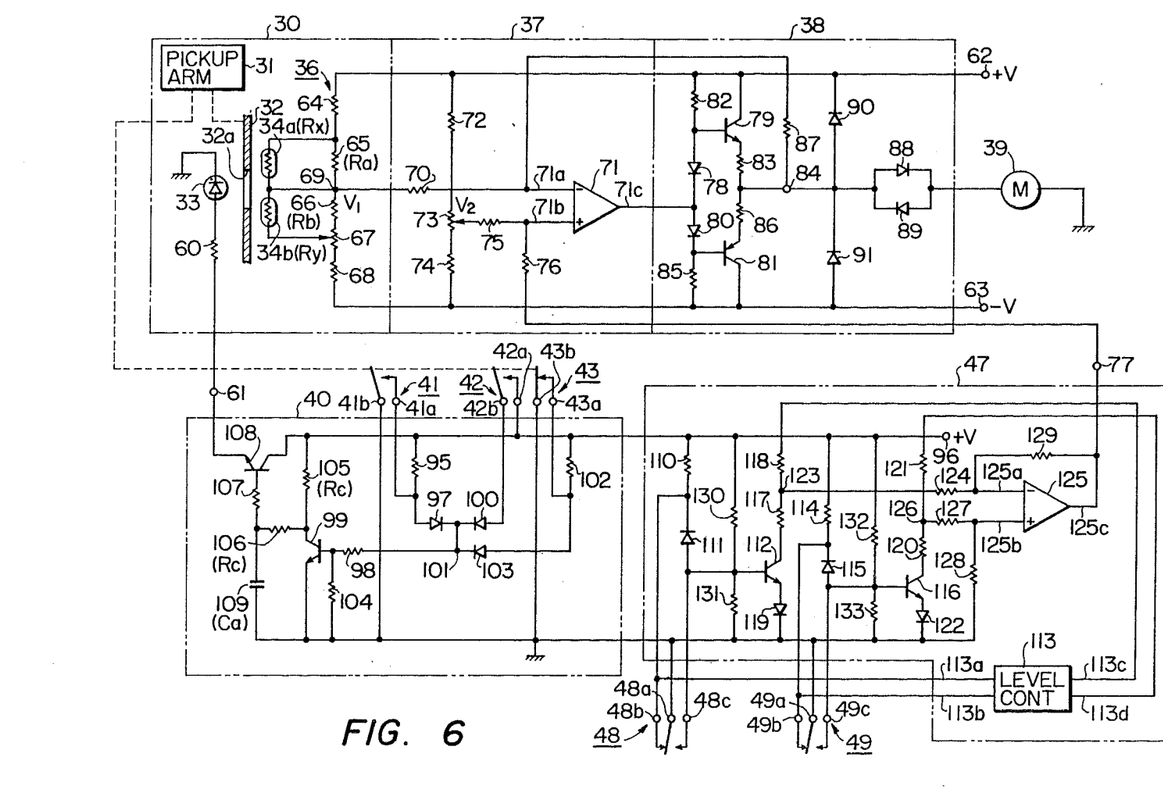
FIG. 6 is a circuit diagram showing a more concrete example of circuit arrangement of the pickup arm movement controlling device of the present invention.

FIG. 6 is a diagram showing an example of concrete circuit arrangement of the pickup arm movement controlling device according to the present invention. In this Figure, like reference numerals and symbols indicate like parts shown in FIG. 2.

In an offset angle detecting mechanism 30, shown in FIG. 6, an LED 33 has one of its terminals connected to an output terminal 61 of an LED controlling circuit 40 via a resistor 60, and its other terminal is grounded. Between a positive power supply terminal 62 and a negative power supply terminal 63 are connected, in series, resistors 64, 65 and 66 and a variable resistor 67 and a resistor 68 in this order. These resistors and variable resistor jointly form an offset angle signal generating circuit 36. A CdS 34a having a resistance value $R_x$ is connected in parallel with the resistor 65, whereas a CdS 34b having a resistance value $R_y$ is connected between a connection point 69 of the resistors 65 and 66 and a slider tap of the variable resistor 67.

A motor controlling circuit 37 and a motor driving circuit 38 are arranged as follows. Said connecting point 69 is connected, via a resistor 70, to an inverting input terminal 71a of an operational amplifier 71 serving as a comparator. Between the positive power supply terminal 62 and the negative power supply terminal 63 are connected a resistor 72, a variable resistor 73 and a resistor 74 in this order. A slider tap of the variable resistor 73 is connected, via a resistor 75, to a non-inverting input terminal 71b of the operational amplifier 71. In the abovesaid arrangement, the respective resistance values of the resistors 64, 65, 68, 72 and 74 and of the variable resistors 67 and 73, and the respective positions of these variable resistors 67 and 73 are so set that, in case the resistance value $R_x$ of the CdS 34a is equal to the resistance value $R_y$ of the CdS 34b, the voltage $V_1$ derived at the connecting point 69, i.e. the voltage delivered to the inverting input terminal 71a, is equal to the voltage $V_2$ derived at the slider tap of the variable resistor 73, i.e. the voltage delivered to the non-inverting input terminal 71b. Also, the non-inverting input terminal 71b is connected, via a resistor 76, to an output terminal 77 of a manual operation controlling circuit 47.

An output terminal 71c of the operation amplifier 71 is connected, via diode 78, to a base of a transistor 79, and further to a base of a transistor 81 via a diode 80. The base of said transistor 79 is connected, via a resistor 82, to the positive power supply terminal 62. Its collector is connected to this positive power supply terminal 62, and its emitter is connected, via a resistor 83, to a terminal 84. The base of the transistor 81 is connected, via a resistor 85, to the negative power supply terminal 63. Its collector is connected to this negative power supply terminal 63, and its emitter is connected, via a resistor 86, to the terminal 84. This terminal 84, in turn, is connected via a resistor 87, to the inverting input terminal 71a, and further to a motor 39 via a parallel connection of diodes 88 and 89. Between the terminal 84 and the positive power supply terminal 62 is connected a diode 90, and between this terminal 84 and the negative power supply terminal 63 is connected a diode 91.

The LED controlling circuit 40 is arranged as follows. A switch means 41 of this circuit 40 has its contact point 41a connected, via a resistor 95, to a positive power supply terminal 96, and further to a base of a transistor 99 via a diode 97 and resistor 98 which are connected in series in this order. Its contact point 41b is grounded. A contact point 42a of a switch means 42 of the circuit 40 is connected to the positive power supply terminal 96, and its contact point 42b is connected, via a diode 100, to a connecting point 101 of the diode 97 and the resistor 98. Also, a contact point 43a of a switch means 43 is connected, via a resistor 102, to the positive power supply terminal 96, and further to said connecting point 101 via a diode 103. Its contact point 43b is grounded. This switch means 41 is adapted to be changed over of its connection interlockingly with the ascending movement and the descending movement of the pickup arm 31 in such way that this switch means 41 is opened when the pickup arm 31 is in its uplifted position, and is closed when this pickup arm is in its lowered position. The switch means 42 and 43 are designed so that their connections are changed over when the pickup arm 31 has arrived at its two extreme limit positions A and B shown in FIG. 3. More particularly, the switch means 42 is a normally-open switch which is closed when the pickup arm 31 has arrived at the limit position A. The switch means 43 is a normally-closed switch and is urged open when the pickup arm 31 has arrived at the other limit position B. The base of the transistor 99 is grounded via a resistor 104, and its collector is connected, via a resistor 105, to the positive power supply terminal 96, and further to a base of a transistor 108 via a resistors 106 and 107 which are connected in series in this order. A connecting point of these resistors 106 and 107 is grounded via a capacitor 109. A collector of said transistor 108 is connected to the positive power supply terminal 96, and its emitter is connected to the output terminal 61.

A manual operation controlling circuit 47 is arranged as follows. A movable contact piece 48a of a switch means 48 is grounded, and its contact point 48b is connected, via a resistor 110, to the positive power supply terminal 96, and further to a base of a transistor 112 via a diode 111. Its contact point 48c is connected to a base of said transistor 112. Also, said contact point 48b of the switch means 48 is connected also to an input terminal 113a of an output level controlling circuit 113. A movable contact piece 49a of a switch means 49 is grounded, and its contact point 49b is connected, via a resistor 114, to the positive power supply terminal 96, and further to a base of a transistor 116 via a diode 115. Its contact point 49c is connected to the base of the transistor 116. Said contact point 49b is connected also to the input terminal 113b of the output level controlling circuit 113. The abovesaid switch means 48 and 49 are arranged so that their movable contact pieces 48a and 49a are normally in contact with the contact points 48b and 49b, respectively. By performing their changeover operations in one stage, the movable contact pieces 48a and 49a are changed over of their connections to positions at which they do not contact any one of the contact points 48b, 49b and the contact points 48c, 49c. By performing a further one-stage changeover operation of these switch means 48 and 49, the movable contact pieces 48a and 49a are brought into contact with the contact points 48c and 49c, respectively. To the base of said transistor 112 is applied, as a bias voltage, a voltage of the positive power supply 96 after being divided by resistors 130 and 131. A collector of this transistor 112 is connected to an output terminal 113c of the output level controlling circuit 113 via resistors 117 and 118 which are connected in series in this order. Its emitter is grounded via a diode 119. To the base of said transistor 116 is applied, as the base voltage, a voltage of the positive power supply 96 after being divided by resistors 132 and 133. A collector of this transistor 116 is connected to an output terminal 113d of the output level controlling circuit 113 via resistors 120 and 121. Its emitter is grounded via a diode 122. A connecting point 123 of said resistors 117 and 118 is connected, via a resistor 124, to an inverting input terminal 125a of an operational amplifier 125 serving as a comparator. A connecting point 126 of said resistors 120 and 121 is connected, via a resistor 127, to a non-inverting input terminal 125b of said operational amplifier 125. This non-inverting input terminal 125b of the operational amplifier 125 is grounded via a resistor 128, and its output terminal 125c is connected, via a resistor 129, to the inverting input terminal 125a, and further to the output terminal 77 of the manual operation control circuit 47. The output level controlling circuit 113 is assigned to output at its output terminal 113c (113d) a predetermined voltage which is proportional to an input voltage applied to the input terminal 113a (113b).

Description will next be directed to the operation of the circuitry having the above-stated arrangement.

In case the pickup arm 31 is in its uplifted position, the LED-controlling circuit 40 turns out the LED 33 so that the offset angle detecting mechanism 30 is disabled. More particularly, in the uplifted position of the pickup arm 31, the switch means 41 is opened, so that a current is allowed to flow from the positive power supply terminal 96 to the base of the transistor 99 via the resistor 95, the diode 97 and the resistor, thereby rendering this transistor conductive. Accordingly, the base potential of the transistor 108 is at a low level, so that this transistor 108 is non-conductive, rendering the LED 33 to be turned out. As a result, CdS's 34a and 34b are not irradiated by the LED 33, so that their respective resistance values are high. Accordingly, the voltage $V_1$ which is derived at the connecting point 69 at such time has a certain value which is determined by the respective resistance values $R_a$ and $R_b$ of the resistors 65 and 66, and the value of this voltage $V_1$ at such time is equal to the value of the voltage $V_2$.

In case, for example, the pickup arm 31 is lowered from the abovesaid position to perform a playing of the record disc, the switch means 41 is closed to cease the supply of the base current to the transistor 99, rendering it non-conductive, while rendering the transistor 108 conductive. Owing to the collector current of the transistor 108, the LED 33 is lighted up. As the beam of light of the LED 33 impinges onto the CdS's 34a and 34b, their resistance values are reduced. Therefore, the voltage $V_1$ which is derived then at the connecting point 69 greatly depends on the resistance values $R_x$ and $R_y$ of the CdS's 34a and 34b. Thus, when the slit-carrying shutter plate 32 is displaced and the amount of light received by these CdS's is varied accordingly, voltage $V_1$ varies in accordance with the variation of the resistance values $R_x$ and $R_y$. In this way, the offset angle detecting mechanism 30 is rendered to the state of being able to detect the offset angle of the pickup arm 31 as the LED 33 is lighted up.

When the playing of the record disc is started under the above-mentioned condition, the offset angle detecting mechanism 30, the motor-controlling circuit 37 and the motor-driving circuit 38 will operate in the manner as follows. When there is a displacement of the pickup arm 31, the voltage $V_1$ at the connecting point 69 varies in accordance with the displacement. This variation of voltage is supplied to the inverting input terminal 71a of the operational amplifier 71. This amplifier 71 compares this varied voltage with the reference voltage applied to the non-inverting input terminal 71b, and outputs, as a motor controlling signal, to the output terminal 71c a voltage (phase-inverted voltage) corresponding to the component of variation $\Delta V_1$ of the voltage at the connecting point 69. If, for example, the voltage at the output terminal 71c is negative, the base potential of the transistor 81 drops accordingly, so that this transistor 81 is rendered conductive. Due to the activation of this transistor 81, its output current is delivered from the terminal 84, through the diode 89, to the motor 39. Thus, the carriage 141 is driven so as to correct the displacement of the pickup arm 31.

On the other hand, the LED-controlling circuit 40 renders the offset angle correcting servo action of the offset angle detecting mechanism 30 to a gradually operating state. That is, in case the value of the resistors 105 and 106 each is assumed to be $R_c$, and the value of the capacitor 109 is assumed to be $C_a$, the base potential of the transistor 108 of the LED-controlling circuit 40 builds up with a time constant T (sec) which is determined by $R_c \cdot C_a$ and its collector current will gradually increase with this time constant. Thus, the amount of light emitting from this LED 33 will gradually increase with a rate of variation corresponding to the above-said time constant.

Figure 7:
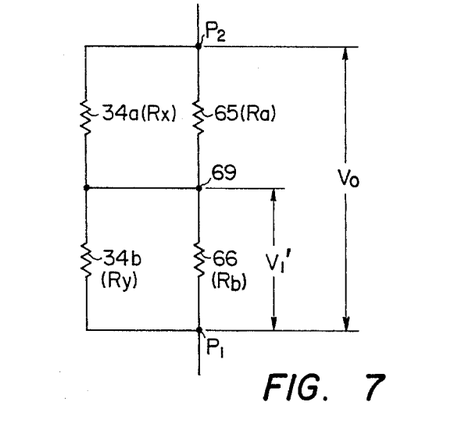
FIG. 7 is a circuit diagram showing the essential part of the offset angle detecting mechanism of FIG. 5.

Let us here consider the voltage which is derived at the connecting point 69 of the offset angle detecting mechanism 30. The circuit which is formed by the CdS's 34a and 34b, the resistors 65 and 66, and the variable resistor 67 in the offset angle detecting mechanism 30 may be expressed in such way as shown in FIG. 7 if the resistance value of the variable resistor 67 is disregarded. In FIG. 7, in case the voltage of the connecting point 69 relative to the connecting point $P_1$ is assumed as $V'_1$ and likewise the voltage at the connecting point $P_2$ is assumed as $V_o$, the following formula will be formed:

$$V'_1 = \alpha V_0 \qquad (1)$$

$$\alpha = \cfrac{1}{1 + \cfrac{\cfrac{R_x \cdot R_a}{R_x + R_a}}{\cfrac{R_y \cdot R_b}{R_y + R_b}}} \qquad (2)$$

Figure 8:
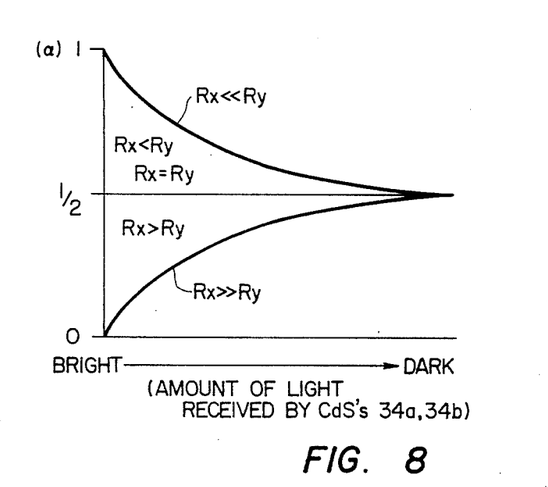
FIG. 8 is an explanatory chart showing the range of variation of the voltage outputted from the offset angle detecting mechanism of FIG. 5.

By setting the relation $R_a = R_b$, the relation between the amount of light received by the CdS's 34a and 34b and $\alpha$ will become as shown in FIG. 8. As will be understood from FIG. 8, the voltage $V'_1$ will vary within the range of the upper limit and the lower limit of $\alpha$ in accordance with the amount of light received by the CdS's 34a and 34b. And, the voltage $V'_1$ will gradually vary by gradually increasing the amount of light of the LED 33. As a result, it will be understood that, even when the pickup arm 31 has been displaced substantially at such time, the pickup arm will not be subjected to an abrupt correction of this displacement but will be moved smoothly because the output of the offset angle detecting mechanism 30 varies gradually.

Also, in case the pickup arm 31 is uplifted from the above-mentioned state based on a desired command, the switch means 41 of the LED-controlling circuit 40 is opened, and in the manner as described above, the servo action of the offset angle detecting mechanism 30 is disabled.

Furthermore, the operation of the manual operation controlling mechanism 47 is effected in the manner as follows, in the state that the pickup arm 31 is in its uplifted position, i.e. in the disabled state of the offset angle detecting mechanism 30.

In the normal state, the switch means 48 and 49 of the controlling mechanism 47 are such that their movable contact pieces 48a and 49a are in contact with the contact points 48b and 49b, respectively. In such state, the respective base potentials of the transistors 112 and 116 are at low level, and accordingly these transistors are not conductive. On the other hand, the potentials at the input terminals 113a and 113b of the output level controlling circuit 113 are at low level, so that the output voltage of the output terminals 113c and 113d are also at low level, respectively. Also, the input voltage which are applied from the connecting points 123 and 126 to the inverting input terminal 125a and the non-inverting terminal 125b of the operational amplifier 125 are at low level, respectively. Thus, the output voltage at its output terminal 125c is nil. Accordingly, at such time the potential at the inverting input terminal 71a of the operational amplifier 71 is equal to the potential at the non-inverting input terminal 71b. Thus, the output voltage of the output terminal 71 thereof is nil, so that the motor 39 is not driven.

In case it is intended to feed the pickup arm 31 to, for example, the left side in FIG. 3, the switch means 48 is manipulated. In case a slow feed is desired, the movable contact piece 48a of the switch means 48 is positioned neutral between the contact point 48b and the contact point 48c. For a quick feed, the movable contact piece 48a is brought into contact with the contact point 48c. At said neutral position of the switch means 48, a bias voltage which is the voltage at the positive power supply terminal 96 after being divided by the resistors 130 and 131 is applied to the base of the transistor 112, rendering this transistor conductive, whereas the input terminal 113a of the output level controlling circuit 113 is rendered to high level, causing the potential at the output terminal 113c to be rendered to high level. It should be noted, however, that the potential at the terminal 113d remains low level. As a result, to the inverting input terminal 125a of the operational amplifier 125 is applied a voltage which is the voltage derived at the output terminal 113c after being divided by the resistors 117 and 118, so that the potential at the inverting input terminal 125a will assume an intermediate level between high level and low level. The potential at the non-inverting terminal 125b remains low level. Accordingly, the operational amplifier 125 outputs a negative voltage corresponding to the difference between the potential at the inverting input terminal 125a and the potential at the non-inverting input terminal 125b, which negative voltage being delivered, as a manual operation signal, to the non-inverting input terminal 71b of the operational amplifier 71 via the output terminal 77 and the resistor 76. Whereupon, the operational amplifier 71 outputs, at its output terminal 71c, a negtive voltage corresponding to said manual operation signal. As a result, in a manner similar to that described above, the transistor 81 is rendered conductive, and the motor 39 is driven, so that the pickup arm 31 is caused to travel to the left side. In such case, the pickup arm 31 is fed at a low feed speed in proportion to the ratio of the resistance values of the resistors 117 and 118.

Also, when the movable contact pieces 48a of the switch means 48 is brought into contact with the contact point 48c, the transistor 112 is rendered non-conductive, and the potential at the output terminal 113c of the output level controlling circuit 113 is rendered to high level, whereas the potential at the output terminal 113d remains low level. Thus, the voltage at the output terminal 113c is applied to the inverting input terminal 125a of the operational amplifier 125, rendering the potential at the inverting input terminal 125a to high level, whereas the potential at the non-inverting input terminal 125b remains low level. Accordingly, in this instance also, a negative manual operation signal is outputted at the output terminal 125c of the operational amplifier 125. Thus, similar to the above-mentioned instance, the pickup arm 31 is fed to the left side. In this case, the pickup arm 31 is fed at a speed greater than that in the preceding instance because the high-level voltage outputted at the output terminal 113c is applied directly to the inverting input terminal 125a due to the "off" state of the transistor 112.

In case it is intended to feed the pickup arm 31 to the right side in FIG. 3, the switch means 49 is manipulated. In this case, this switch means 49 is operated in much the same way as the switch means 48. When it is intended to make a slow feed of the pickup arm, the movable contact piece 49a of this switch means is brought to a neutral position between the contact points 49b and 49c. For a quick feed, the movable contact piece 49a is brought into contact with the contact point 49c. In such manipulation of the switch means 49, the transistor 116 will be rendered "on" and "off" in the same manner as for the on-off actions of the transistor 112 for the feed to the left side. And, a voltage similar in relation to the aforesaid left feed is outputted at the output terminal 113d of the output level controlling circuit 113. Therefore, in this instant case, when the potential at the inverting input terminal 125a of the operational amplifier 125 is at low level, the potential at its non-inverting input terminal 125b is either at intermediate level or at high level. Thus, a positive manual operation signal is outputted at its output terminal 125c to be delivered to the non-inverting input terminal of the operational amplifier 71. As a result, a positive motor-controlling signal is outputted at the output terminal 71c of this amplifier. This renders the transistor 79 conductive, and its output current is applied to the motor 39, to thereby feed the pickup arm to the right side.

Next, description will be made of the instance where the pickup arm 31 is held in its lowered position by the fingers of the user so as to be moved in a desired horizontal direction. Firstly, this pickup arm is imparted a displacement tendency in the desired direction by the user's fingers, causing the offset angle detecting mechanism 30 to generate an output at its connecting point 69. This output causes the motor 39 to be driven, whereby the pickup arm is fed either to the left side or to the right side easily. During this hand-mode operation, the pickup arm is in its lowered position but its stylus is not contacting the record surface. As such, the swtich means 41 of the LED-controlling circuit 40 is closed, and the transistor 99 is non-conductive, whereas the transistor 108 is conductive. When the pickup arm which is being fed to the left side arrives at the left limit position A, the switch means 42 which till then has been open is closed. Whereby, a current is supplied from the positive power supply terminal 96 to the base of the transistor 99 via the diode 100 and the resistor 98. Thereafter, in a manner similar to that described above, the transistor 99 is rendered conductive, and the transistor 108 is rendered non-conductive, so that the LED 33 is turned out. As a result, the offset angle detecting mechanism 30 ceases to generate an output, so that the pickup arm 31 is stopped of its movement. On the other hand, in case the pickup arm is fed to the right side and arrives at its right limit position B, the switch means 43 which till then has been closed is opened. Whereupon, the current is allowed to flow from the positive power supply terminal 96 to the base of the transistor 99 via the resistor 102, the diode 103 and the resistor 98. Thereafter, in a manner same as that described above, the LED 33 is turned out. Thus, a further movement of the pickup arm is inhibited.

It should be noted here that the above-described offset angle detecting mechanism utilizing the photo-electricity converting system may be such a light-reflecting type system as disclosed in U.S. Pat. No. 4,083,565 in which the amount of light received by the light-receiving elements from the light-emitting element is adapted to be controlled by the light-reflecting member which is displaced inter-lockingly with an offset angle of the pickup arm.

What is claimed is:

1. A device for controlling movements of a pickup arm in a linear tracking pickup arm apparatus, comprising:
    a pickup arm;
    means for supporting said pickup arm for vertical and horizontal movements;
    carriage means for carrying said pickup arm and said supporting means and being movable in direction perpendicular to the longitudinal axis of said pickup arm;
    means for driving said carriage means; and
    means of photo-electricity converting type for detecting a horizontal offset angle of said pickup arm and comprising a light-emitting element and a light-receiving element which receives a light beam of an amount corresponding to said offset angle,
    the improvement comprising:
    offset angle signal generating means connected to said offset angle detecting means for generating an offset angle signal of a value and a polarity corresponding to a magnitude and a direction of a detected offset angle of the pickup arm;
    means for controlling the movement of said carriage means and being responsive to the offset angle signal to drive said carriage means to move said pickup arm so as to reduce said offset angle;
    light-emitting element controlling means including means for detecting a position of said pickup arm for turning out a light-emission of said light-emitting element of said offset angle detecting means when the pickup arm is at one of its predetermined positions to thereby disable offset angle detecting means; and
    manual controlling means including manually operable switch means for delivering to said carriage controlling means a carriage dirving signal in accordance with a manual operation of said switch means when said off-set angle detecting means is disabled.

2. A device according to claim 1, in which the pickup arm supporting means is comprised of a vertical supporting section for supporting the pickup arm for horizontal swings relative to said carriage means and a horizontal supporting section mounted above said vertical supporting section for supporting the pickup arm for vertical swings.

3. A device according to claim 1, in which said vertical supporting section is comprised of vertical shaft means mounted via bearing means on said carriage means, and said horizontal supporting section is comprised of a horizontal bearing means of U-shape for supporting the pickup arm by pivot means.

4. A device according to claim 1, in which said carriage means is adapted to move on roller means along a linearly extending guide means.

5. A device according to claim 1, in which said carriage driving means is comprised of a motor and a motor driving circuit assigned for driving said motor.

6. A device according to claim 6, in which said motor is comprised of a dc motor, and the motor-driving circuit outputs to said dc motor a voltage of a magnitude and a polarity corresponding to its input signal.

7. A device according to claim 1, in which said offset angle detecting means is comprised of: the light-emitting element in a fixed relation to said carriage means; the light-receiving element in a fixed relation to said carriage means for receiving a light beam emitting from said light-emitting element; and means in a fixed relation relative to the horizontal movement of the pickup arm and being displaced in accordance with the horizontal offset angle of the pickup arm for controlling an amount of light arriving at said light-receiving elements.

8. A device according to claim 1, in which said light-emitting element is comprised of a light-emitting diode.

9. A device according to claim 8, in which said light-receiving element is comprised of a pair of photo-electricity conversion units which produce an output in accordance with an amount of light received, and said means for controlling an amount of light arriving at said light-receiving element is comprised of a light-shuttering member having a slit and being adapted to be displaced in accordance with the offset angle of the pickup arm and transmitting to said pair of units a light from said light-emitting element through said slit to vary the output of the units.

10. A device according to claim 1, in which said means for controlling an amount of light arriving at said light-receiving element is comprised of a light-reflecting member.

11. A device according to claim 1, in which said offset angle signal generating means is comprised of a voltage dividing network connected across a positive power supply and a negative power supply, and said light-receiving elements comprise two photo-electricity conversion units, and said two units are connected in series with each other and in parallel to the voltage dividing network, respectively, and said voltage dividing network derives as an output signal a voltage varying in accordance with a difference in light received by the two units.

12. A device according to claim 1, in which the carriage controlling means includes a comparator adapted to receive, at one input terminal, an output signal from the offset angle signal generating means and to receive, at the other input terminal, a reference signal or an output signal from said manual controlling means to deliver to the carriage driving means a signal from its output terminal.

13. A device according to claim 1, in which said manual controlling means includes a comparator, first switch means and second switch means, and is adapted to receive, at one input terminal, a signal of a level corresponding to an operation of said first switch means, and to receive, at the other input terminal, a signal corresponding to an operation of said second switch means, and delivers at its output terminal a signal for the carriage controlling means.

14. A device according to claim 1, in which said first switch means is comprised of a manual switch for moving said carriage means in a certain direction, and said second switch means is comprised of a manual switch for moving said carriage means in another direction.

15. A device according to claim 1, in which said first switch means is adapted to be changed over of its connection in three stages for stopping, slow feed and quick feed of the carriage means, and a low level signal, an intermediate level signal and a high level signal are applied to said one input terminal of said comparator in correspondence to said changeover of said first switch means.

16. A device according to claim 15, in which said second switch means is adapted to be changed over of its connection in three stages for stopping, slow feed and quick feed of the carriage means, and a low level signal, an intermediate level signal and a high level signal are applied to said other input terminal of said comparator in correspondence to said changeover of said second switch means.

17. A device according to claim 1, in which the light-emitting element controlling means includes a switching element for controlling a current supply to said light-emitting element, said switching element being controlled by a detection signal delivered from means for detecting a position of the pickup arm.

18. A device according to claim 17, in which the pickup arm position detecting means is comprised of a first detector for detecting an up-lifted position of the pickup arm, and said switching element is turned off as said first detector makes detection of uplifting of the pickup arm.

19. A device according to claim 18, in which the means for detecting a position of the pickup arm is comprised of a second detector for detecting an arrival of the pickup arm at one of limiting positions in a horizontal travel for the carriage, and upon detection by said second detector of arrival of the pickup arm at said one of limiting positions, said switching element is turned off, whereby the light-emitting element is turned out.

20. A device according to claim 18, in which the means for detecting a position of the pickup arm is comprised of a third detector for detecting an arrival of the pickup arm at another one of limiting positions in a horizontal travel of the carriage, and upon detection by said third detector of arrival of the pickup arm at said another limiting position, said switching means is turned off, whereby the light-emitting element is turned out.

21. A device according to any one of claims 18, 19 and 20, in which said position detecting means is comprised of a switch.

22. A device according to claim 18, in which said switching element is adapted to make a gradual transit from its non-conductive state to its conductive state, to thereby gradually turn on the light-emitting element.

23. A device according to claim 1, in which said gradual transit from non-conductive state to conductive state of said switching element is carried out by a time constant circuit connected to a control terminal of said switching element, and said means for detecting a position of the pickup arm is connected to the switching element via the time constant circuit.

24. A device according to claim 1, in which said light-emitting element control means further comprises another switching element connected to said time constant circuit, said means for detecting a position of the pickup arm being connected to said another switching element.

25. A device according to claim 24, in which said another switching element is rendered conductive upon receipt of a detection signal outputted by said means for detecting a position of the pickup arm when it detects a required position of the pickup arm, and is rendered non-conductive at absence of said detection signal.

26. A device according to claim 18, in which said switching element is a transistor.

* * * * *

UNITED STATES PATENT AND TRADEMARK OFFICE
CERTIFICATE OF CORRECTION

PATENT NO. : 4,325,016
DATED : April 13, 1982
INVENTOR(S) : Atsushi TAKEUCHI

It is certified that error appears in the above—identified patent and that said Letters Patent is hereby corrected as shown below:

Column 14:

Claim 1, line 3 read "dirving" as --driving--
    Claim 6, line 26 read "claim 6" as --claim 5--
    Claim 8, line 40 read "claim 1" as --claim 7--
    Claim 10, line 53 read "claim 1" as --claim 9--

Column 15:

Claim 14, line 18 read "claim 1" as --claim 13--
    Claim 15, line 23 read "claim 1" as --claim 14--

Column 16:

Claim 23, line 27 read "claim 1" as --claim 22--
    Claim 24, line 34 read "claim 1" as --claim 23--

Signed and Sealed this

Twenty-second Day of February 1983

[SEAL]

Attest:

GERALD J. MOSSINGHOFF

Attesting Officer     Commissioner of Patents and Trademarks